April 20, 1943.　　F. R. HIGLEY ET AL　　2,317,271
SNAP VALVE
Filed Sept. 9, 1940　　3 Sheets-Sheet 1

INVENTORS
FRANK R. HIGLEY
VILYNN O. BEAM
BY Kwis Hudson & Kent
ATTORNEYS

April 20, 1943.  F. R. HIGLEY ET AL  2,317,271
SNAP VALVE
Filed Sept. 9, 1940  3 Sheets-Sheet 2

INVENTORS
FRANK R. HIGLEY
BY VILYNN O. BEAM
Kwis Hudson & Kent
ATTORNEYS

April 20, 1943.　　F. R. HIGLEY ET AL　　2,317,271
SNAP VALVE
Filed Sept. 9, 1940　　3 Sheets-Sheet 3

INVENTORS
FRANK R. HIGLEY
BY VILYNN O. BEAM
Kwis Hudson & Kent
ATTORNEYS

Patented Apr. 20, 1943

2,317,271

UNITED STATES PATENT OFFICE 2,317,271

SNAP VALVE

Frank R. Higley and Vilynn O. Beam, Cleveland Heights, Ohio, assignors to The Bryant Heater Company, Cleveland, Ohio, a corporation of Ohio Application September 9, 1940, Serial No. 356,011

6 Claims. (Cl. 137—153)

This invention relates to improvements in snap valves, and has to do particularly with the construction of the body or casing parts of such a valve in a manner such that the intake and outlet valve passages and the passage for fluid to and from the pressure chamber may be related in various ways when the parts are assembled.

One of the applications for valves of this type is in automatically controlled valves for oven or broiler burners in gas ranges. An example of such a system is to be found in the application of Frank R. Higley, Serial No. 354,061, filed August 24, 1940. Inasmuch as the design of ranges varies considerably, automatic valves may occupy any one of numerous positions in the range, as may also the gas supply connections and the conductor for conveying gas to the pressure chamber of the valve. The valve of the present invention is so designed that it may be assembled in different ways according to the requirements of the job in hand so as to arrange the different connections in such positions relative to each other that the assembly of the valve in a range may be facilitated, a minimum amount of material may be employed, and a minimum amount of space occupied.

One of the objects of the invention therefore is the provision of a snap valve with a pressure chamber control, so constituted that it may fit a variety of different installations.

Another object of the invention is the provision of parts to form a combined switch and snap valve so constituted that by the omission of one part and the substitution of another part the device may be converted into a snap valve without an associated switch.

Another object is the provision of a snap valve comprising a plurality of different connections carried in separate parts of the unit, which separate parts are adapted to fit together in a plurality of different angular relations, whereby the device may be so assembled that the various connections are angularly arranged to the best advantage for any given installation.

A further object of the invention is the provision of a new type diaphragm-operated electric switch, which is adapted to function satisfactorily under light pressure and in spite of relatively large manufacturing tolerances.

Other objects and features of novelty will appear as we proceed with the description of those embodiments of the invention which, for the purposes of the present application, we have illustrated in the accompanying drawings, in which Fig. 1 is a vertical sectional view of a combined snap valve and switch embodying the invention.

Figure 2:
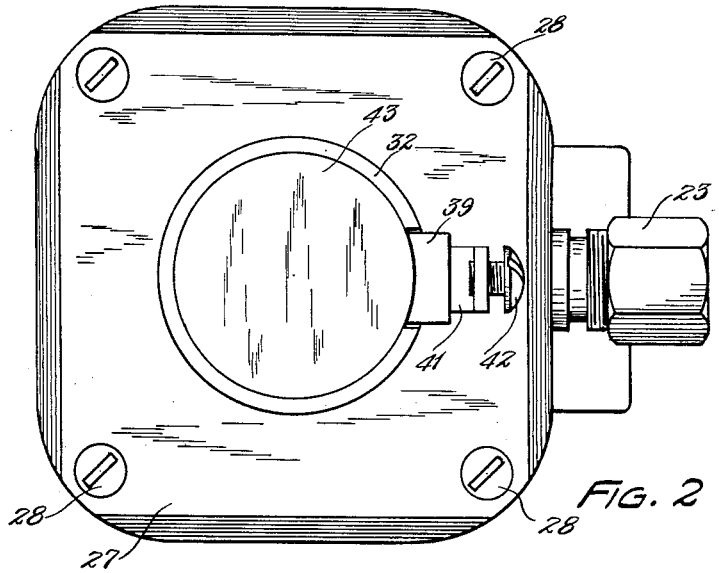
Fig. 2 is a top plan view thereof.
Figure 1:
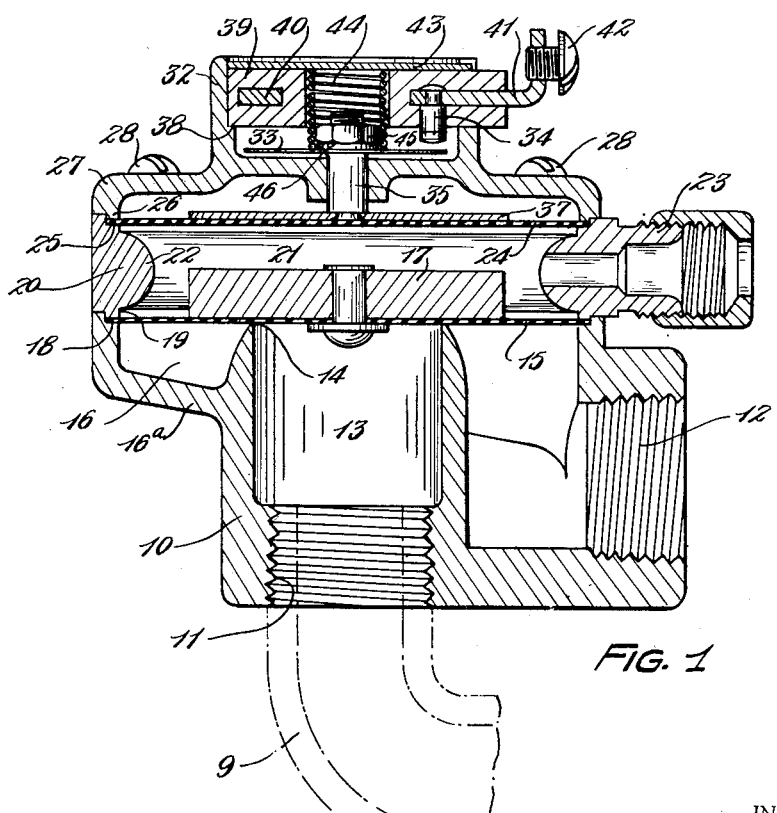

In the drawings, which disclose the invention as applied to a small size, small capacity valve adapted for use in a gas range, 10 is the valve body with a threaded intake opening 11 for connection to the gas supply line and an outlet opening 12 which is to be connected through a suitable conductor with the gas burner. Above the intake opening 11 there is a cylindrical passage 13 terminating at the top in a valve seat 14. A flexible diaphragm 15 rests normally on the valve seat and thereby closes the valve and cuts off gas to the burner. In the valve body surrounding the valve seat and the wall of passage 13 there is an annular passage 16 which is deepest at the outlet 12 and shallowest at a point diametrically opposite the outlet, the bottom wall 16a of the passage sloping as indicated in Fig. 1. This construction provides better flow conditions within the passage and requires less material than heretofore.

Above the diaphragm and centrally secured thereto is a weight 17 of circular disk form. The diaphragm 15, which is circular and very thin, is preferably formed of synthetic rubber. At its periphery it is mounted in a circular groove 18 and pressed into said groove by an annular rib 19 on a ring or wall member 20 forming the side wall of a pressure chamber 21.

It is desirable to limit the volumetric capacity of chamber 21 to as small an amount as possible because in that way the speed of operation of the valve is increased, that is the time required to fill chamber 21 with fluid or to exhaust it therefrom is reduced. With this thought in mind we use material of large volume to weight ratio, such as aluminum, for the weight 17, and we build ring 20 with an inwardly bulging wall 22, which takes up space without interfering with the diaphragm movements. The external surface of ring 20 is preferably rectangular, and from one side there projects a connection 23 adapted to receive a conductor (not shown) for conveying pressure fluid into and out of chamber 21. Preferably the conductor is a tubular one of fine bore, so that it may be readily bent into desired position during the mounting of the valve in a range.

In the preferred form of the invention the pressure chamber 21 is closed at the top by a second diaphragm 24 which may be identical with diaphragm 15 in form, size and material. This diaphragm rests in an annular groove 25 and is clamped therein by a rib 26 on the bottom of a cover 27. The valve body 10, the ring 20 and the cover 27 are all secured together by screws 28 which extend through smooth holes 29 in the cover and smooth holes 30 in the ring into threaded holes 31 in the body. Each of these three members has four holes, so that each member may have four different angular positions relative to the other members. The intake 11 in the bottom of the valve body may be connected with a vertical pipe or it may be connected with an elbow, indicated at 9, which may be turned into any desired angular position. As will be appreciated by one familiar with the art, by suitable proportioning either opening 11 or 12 may be selected for the inlet, the other serving as the outlet.

Cover 27 has a cylindrical upward extension 32 in which we mount an electric switch that comprises a flexible metal plate 33 and a plurality of spaced contacts 34. Plate 33 may be mounted centrally upon a plunger 35 that is guided by a cylindrical opening 36 in the cover and is attached at its lower end to a thin round plate 37 which rests upon the upper surface of diaphragm 24.

Extension 32 is machined internally down to a shoulder 38 upon which rests a molded insulation ring 39 in which there is a metal ring insert 40 carrying the contacts 34 and which has a lateral extension 41 bent up and provided with a threaded hole to receive a binding post 42, by means of which connection may be made with an electric conductor. To hold the ring 39 in its socket and to exclude foreign matter, a metal disk 43 may be pressed into the machined cylindrical surface above the ring.

Figure 7:
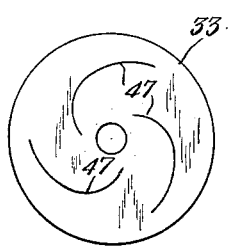
Fig. 7 is a detail view of a flexible switch plate which we may employ.
Figure 8:
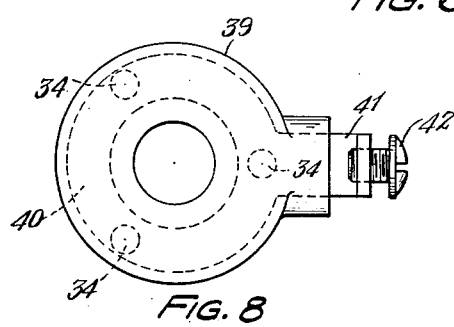
Fig. 8 is a plan view of an insulation ring in which the switch contacts are carried.

In order to return plate 33 to its lowermost position when there is no pressure in the pressure chamber we may use a coil spring 44 within the opening of ring 39, which presses at its upper end against disk 43 and at its lower end against plate 33 surrounding a nut 45 and washer 46 that are employed to anchor the central part of plate 33 to plunger 35. The plate 33, as illustrated in Fig. 7, has a series of curved slits 47 therein formed in an annular zone between the central anchored portion of the plate and the peripheral portion which at times engages contacts 34. The plate is therefore weakened in this intermediate zone, whereby its flexibility is increased, and it is enabled to conform to the ends of the contacts even though they may not be arranged accurately in a plane. Plate 33 is preferably made of spring bronze silver plated. The contacts 34 are likewise silver tipped.

It will be apparent that when chamber 21 is filled with controlling fluid under pressure, such as gas at line pressure, that pressure acting upon the entire upper surface of the diaphragm as against the pressure acting upon the lower surface within the confines of the valve seat 14 will cause the diaphragm to engage the valve seat. At the same time diaphragm 24 will raise plate 33 into engagement with contacts 34. The circuit (not herein shown) completed by this closing of the switch may be caused to energize an electric igniter, as will be well understood by those skilled in the art. When the pressure in chamber 21 is relieved, either automatically or otherwise, plate 33 will fall away from contacts 34, opening the circuit above referred to, and the pressure of gas in passage 13 will lift diaphragm 15, enabling gas to flow to the burner through outlet 12.

Figure 6:
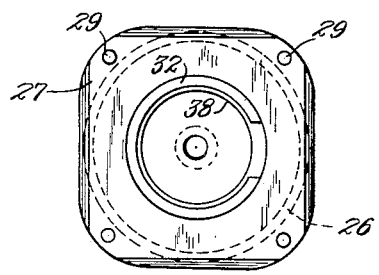
Fig. 6 is a plan view of the valve cover and switch casing combined.
Figure 10:
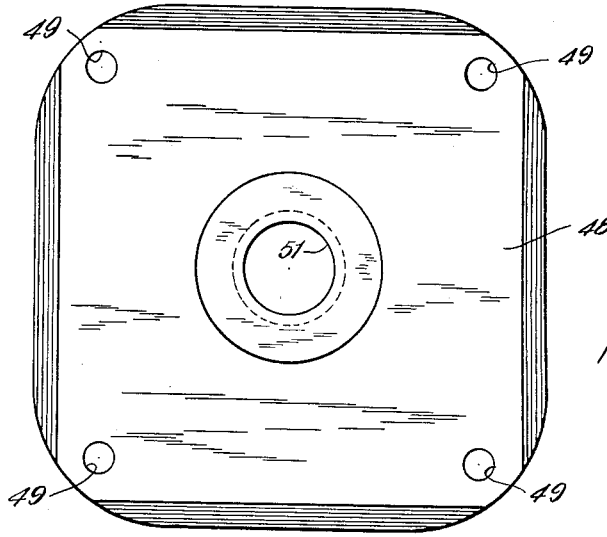
Fig. 10 is a plan view of the cover shown in Fig. 9.
Figure 9:
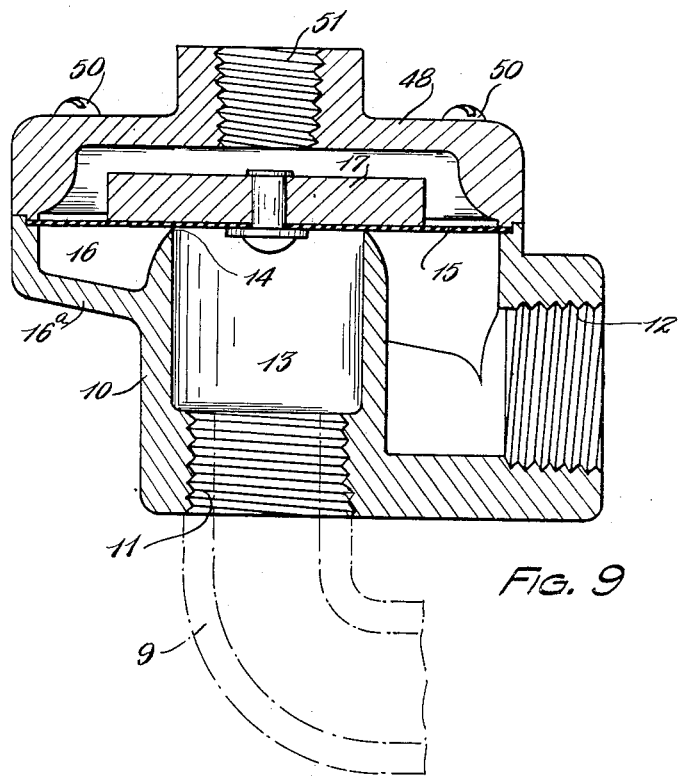
Fig. 9 is a view corresponding to Fig. 1, showing a modification in which the electric switch is omitted.

When electric ignition is not required we dispense with the electric switch and the upper diaphragm and use a different cover, as illustrated in Figs. 9 and 10. In this form of the invention the upper wall of the pressure chamber consists of a cover 48 which clamps diaphragm 15 to the body member, and to that end is provided with smooth holes 49, corresponding to the holes 29 of Fig. 6, for the reception of screws 50 that are threaded into the threaded openings 31 of the valve body. At some point in the top of the cover, preferably at the center, there is provided a threaded boss 51 for the reception of a tubular conductor, not shown, through which controlling fluid may be caused to enter and leave the pressure chamber.

Figure 3:
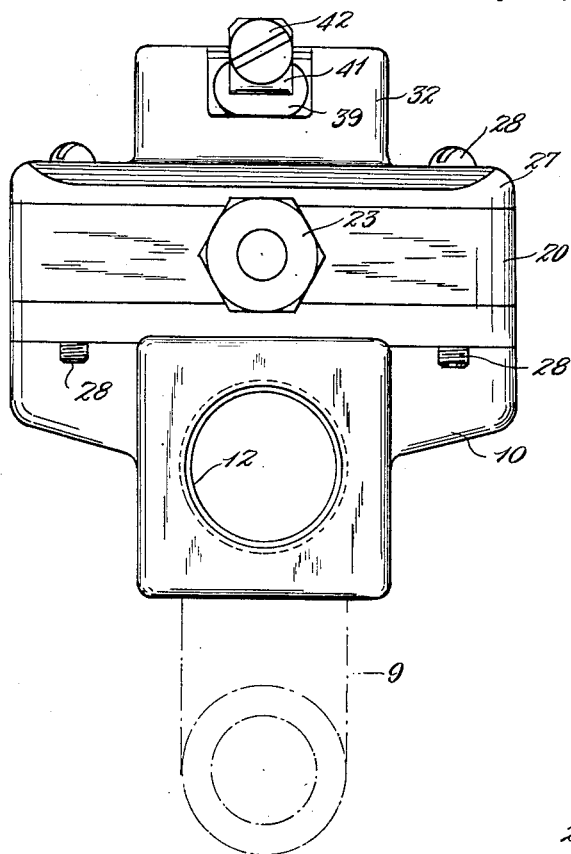
Fig. 3 is a side elevational view of the same.
Figure 4:
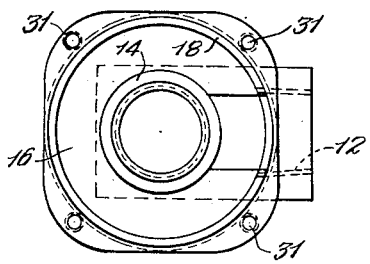
Fig. 4 is a top plan view of the valve body.
Figure 5:
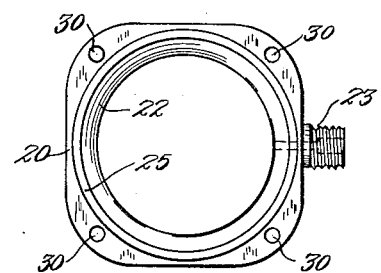
Fig. 5 is a plan view of the ring or side wall member of the pressure chamber.

It will be observed that the lower part of the valve body beneath the part in which the annular passage 16 is formed, has a rectangular contour as indicated in Figs. 1, 3 and 4, which provides parallel surfaces for engagement with a wrench in order that the valve body may be threaded down upon the pipe connection 9 with the lateral outlet 12 disposed in any one of four different directions at 90° intervals, in other words facing forwardly, backwardly or sidewise with respect to the piece of equipment on which the valve is used.

Having thus described our invention, we claim:

1. In a construction of the class described, a body member having a centrally positioned bottom pipe connection, a valve seat above said connection, a diaphragm mounted concentric therewith adapted to cooperate with said seat, said body having two branch passages around said seat and a second pipe connection with said body at the point of vergency of said passages, each of said passages increasing in sectional area with approach to said second pipe connection, and a pressure chamber on the opposite side of said diaphragm.

2. In a construction of the class described, a body member having a centrally positioned bottom pipe connection, a valve seat above said connection, a diaphragm mounted concentric therewith adapted to cooperate with said seat, said body having two branch passages around said seat and a second pipe connection with said body at the point of vergency of said passages, each of said passages increasing in depth with approach to said second pipe connection, and a pressure chamber on the opposite side of said diaphragm.

3. In a construction of the class described, a body member having a seat, a diaphragm cooperating with said seat, a pressure chamber on the opposite side of said seat, said pressure chamber having an internal circular wall engaging the periphery of said diaphragm and extending inwardly from said circle of engagement but away from the diaphragm, whereby the fluid content of said chamber is reduced without diminishing the active area of the diaphragm.

4. In a valve construction, a body member generally square in cross section having an axial pipe connection and a lateral pipe connection, a seat in said body member in effect between said connections, diaphragm means cooperating with said seat, a pressure chamber on the opposite side of said diaphragm means, said pressure chamber comprising a wall having a lateral connection and four bolts at the four corners of said body member outside said diaphragm for securing said pressure chamber to said body with said lateral connection in the same radial position as said lateral opening, opposite said opening or at either side thereof.

5. In a valve construction, body means including cooperative body and cover members arranged to provide annular clamping surfaces for a circular diaphragm with a pressure chamber thereabove, said pressure chamber having a lateral connection, said body member having axial inlet and lateral outlet openings therebelow, and four bolt means evenly spaced about and adjacent said diaphragm for interconnecting said body and cover members with the diaphragm therebetween, said body means being generally square, with said bolt means disposed at the corners thereof and said diaphragm extending adjacent the sides thereof between said bolt means, whereby a rectangular system is provided permitting each of the lateral connection above and below said diaphragm to extend in any one of four directions spaced 90° apart.

6. In a valve construction, cooperative body and cover members with a diaphragm therebetween providing a pressure chamber above the diaphragm, said body member having an axial bottom intake connection ending in a circular valve seat for the diaphragm and having two branch passages around said seat and a lateral pipe connection at the point of vergency of said passages, each of said passages increasing in depth with approach to said lateral pipe connection, and the lower portion of the body beneath said branch passages having a pair of inwardly offset parallel surfaces for engagement with a wrench.

FRANK R. HIGLEY.
VILYNN O. BEAM.